United States Patent
Li et al.

(10) Patent No.: US 7,286,317 B1
(45) Date of Patent: Oct. 23, 2007

(54) DISK DRIVE THAT COMPENSATES FOR REPEATABLE RUNOUT OF A DISK BASED ON MEASURED TIMING BETWEEN SERVO INFORMATION AND METHODS THEREOF

(75) Inventors: Yunfeng Li, San Jose, CA (US); Yu Sun, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 201 days.

(21) Appl. No.: 11/112,391

(22) Filed: Apr. 22, 2005

Related U.S. Application Data (60) Provisional application No. 60/649,825, filed on Feb. 3, 2005.

(51) Int. Cl.
*G11B 5/596* (2006.01)

(52) U.S. Cl. .................................. 360/77.04
(58) Field of Classification Search ............. 360/77.04, 360/77.06, 77.08, 78.01, 78.14, 17, 46, 51
See application file for complete search history.

(56) References Cited

U.S. PATENT DOCUMENTS

| | | | |
|---|---|---|---|
| 5,684,650 A * | 11/1997 | Kadlec et al. ........... 360/77.06 |
| 5,859,742 A * | 1/1999 | Takaishi .................. 360/78.01 |
| 5,914,830 A * | 6/1999 | Kadlec et al. ........... 360/78.14 |
| 6,347,018 B1 * | 2/2002 | Kadlec et al. ........... 360/77.08 |
| 6,738,205 B1 * | 5/2004 | Moran et al. ................. 360/17 |
| 6,853,514 B2 * | 2/2005 | Li et al. .................. 360/77.04 |
| 7,085,094 B1 * | 8/2006 | Heimbaugh et al. ..... 360/77.04 |
| 2005/0174672 A1 * | 8/2005 | Kim ............................ 360/51 |
| 2005/0231844 A1 * | 10/2005 | Annampedu et al. ......... 360/46 |

* cited by examiner

*Primary Examiner*—Fred F. Tzeng
(74) *Attorney, Agent, or Firm*—Myers Bigel Sibley & Sajovec, P.A.

(57) ABSTRACT

A disk drive includes a rotatable data storage disk, a transducer, an actuator, and a controller. The disk includes information and data tracks that are defined thereon. The transducer is configured to read the information from the disk. The actuator is configured to position the transducer relative to the data tracks. The controller is configured to measure timing between particular information on the disk, to estimate repeatable runout of the disk based on the measured timing, and to compensate for repeatable runout of the disk responsive to the estimated repeatable runout while positioning the transducer relative to a selected track.

20 Claims, 5 Drawing Sheets

DISK DRIVE THAT COMPENSATES FOR REPEATABLE RUNOUT OF A DISK BASED ON MEASURED TIMING BETWEEN SERVO INFORMATION AND METHODS THEREOF

RELATED APPLICATION

This application claims the benefit of and priority to U.S. Provisional Patent Application Ser. No. 60/649,825, filed Feb. 3, 2005, the disclosure of which is hereby incorporated herein by reference as if set forth in its entirety.

FIELD OF THE INVENTION

The present invention generally relates to digital data storage devices and, more particularly, to writing data in a magnetic disk drive.

BACKGROUND OF THE INVENTION

Computer disk drives store information on disks or platters. Typically, the information is stored on each disk in concentric tracks. The data tracks are usually divided into sectors. Information is written to and read from a storage surface(s) of a disk by a transducer. The transducer may include a read element separate from a write element, or the read and write elements may be integrated into a single read/write element. The transducer is mounted on an actuator arm capable of moving the transducer radially over the disk. Accordingly, the movement of the actuator arm allows the transducer to access different data tracks. The disk is rotated by a spindle motor at a high speed, allowing the transducer to access different sectors within each track on the disk.

The actuator arm is coupled to a motor or coarse actuator, such as a voice coil motor (VCM), to move the actuator arm such that the transducer moves radially over the disk. Operation of the coarse actuator is controlled by a servo control system. The servo control system generally performs two distinct functions: seek control and track following. The seek control function includes controllably moving the actuator arm such that the transducer is moved from an initial position to a target track position. In general, the seek function is initiated when a host computer associated with the computer disk drive issues a command to read data from or write data to a target track on the disk. Once the transducer has been moved sufficiently close to the target track by the seek function of the control system, the track following function of the servo control system is activated to center and maintain the transducer on the target track until the desired data transfers are completed.

The track following function of the servo control system generally includes maintaining the transducer at a desired position with respect to a track being followed (e.g., over a centerline of the track). Typically, the transducer must be moved slightly during track following to maintain a desired position over the track. This is because, due to various factors, the track may appear to move beneath the transducer. There are numerous outside influences which can make it difficult for the servo control system to maintain the desired position over the track, one such influence is known as "runout."

Runout generally refers to deviation from perfect circular motion and, more particularly, refers to variation in the distance between an external point of reference and a passing surface of a rotating object. "Repeatable runout" involves periodic deviations that occur with predictable regularity (hereafter "RRO"). "Nonrepeatable runout" involves random perturbations due, for example, to bearing slop, shock events, and so on (hereafter NRRO). In the context of a disk drive, RRO is "repeatable" because it occurs in sync with the spinning disk. RRO may be caused by one or more of the following mechanical sources: a) spindle motor runout; b) disk slippage; c) disk warping; d) disturbances converted to RRO during a servo writing process due to, for example, NRRO, vibrations, resonances, media defects, or disk distortion due to clamping of the HDA. RRO may also be caused by electromagnetic imperfections due to low quality servo positioning bursts, even if they were mechanically recorded on the ideal circle. Such low quality servo positioning bursts can yield incorrect position information.

The ability to precisely position a transducer with respect to a track being followed has become increasingly important as data and track densities in hard disk drives have increased. Adaptive runout cancellation may be used during track following to feed-forward a control signal to the servo control system to continually move the transducer so as to compensate for the time varying effect of RRO. However, continual movement of the transducer during track following can consume a substantial amount of power in the disk drive, which may be unacceptable when the disk drive is within a battery powered device.

SUMMARY OF THE INVENTION

In some embodiments of the present invention, a disk drive includes a rotatable data storage disk, a transducer, an actuator, and a controller. The disk includes information and data tracks that are defined thereon. The transducer is configured to read the information from the disk. The actuator is configured to position the transducer relative to the data tracks. The controller is configured to measure timing between particular information on the disk, to estimate repeatable runout of the disk based on the measured timing, and to compensate for repeatable runout of the disk responsive to the estimated repeatable runout while positioning the transducer relative to a selected track.

In some further embodiments, the disk includes servo information in servo sectors of the disk. The servo information in each sector can include a servo address mark (SAM). The controller can be further configured to measure timing between the SAM in different servo sectors of the disk, such as between adjacent servo sectors around the disk, and to estimate the repeatable runout of the disk responsive to the measured timing. The controller can also generate a position error signal from the servo information that is read by the transducer. It can also measure a magnitude and phase of at least a first harmonic of the repeatable runout of the disk based on the variation in the measured timing, and can generate a repeatable runout compensation signal therefrom. The controller can position the transducer responsive to the position error signal and the repeatable runout compensation signal.

Some other embodiments of the present invention provide methods of compensating for repeatable runout of the disk in a disk drive. Information is read from the disk. Timing between the information that is read from the disk is measured. Repeatable runout of the disk is estimated based on the measured timing. Repeatable runout of the disk is compensated for responsive to the estimated repeatable runout while positioning the transducer relative to a selected track.

DETAILED DESCRIPTION OF THE INVENTION

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings of the present invention.

The present invention may be embodied in hardware (analog and/or discrete) and/or in software (including firmware, resident software, micro-code, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 1:
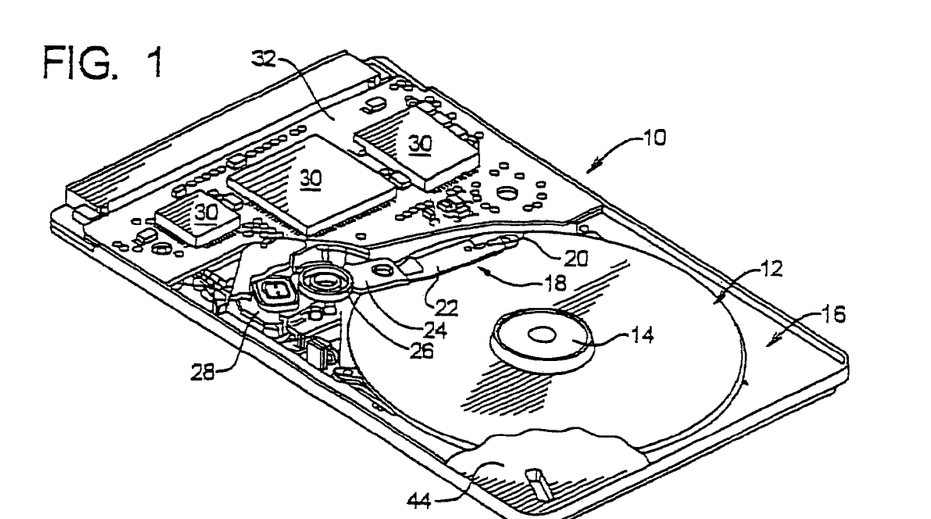
FIG. 1 is a perspective view of a disk drive that is configured in accordance with some embodiments of the present invention.

A simplified diagrammatic representation of an exemplary disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16. The disk drive 10 is configured to store and retrieve data responsive to write instructions and read instructions from a host device. A host device can include, but is not limited to, a desktop computer, a laptop computer, a personal digital assistant (PDA), a digital video recorder/player, a digital music recorder/player, and/or another electronic device that can be communicatively coupled to store and retrieve data in the disk drive 10.

The actuator arm assembly 18 includes a transducer 20 (or head) mounted to a flexure arm 22 which is attached to an actuator arm 24 that can rotate about a pivot bearing assembly 26. The transducer 20 may include, but is not limited to, a magnetoresistive (MR) element, a thin film inductive (TFI) element, and/or an inductive coil element. The actuator arm assembly 18 also includes a voice coil motor (VCM) 28 which moves the transducer 20 relative to the disk stack 12. The spindle motor 14 and actuator arm assembly 18 are coupled to a controller and associated electronic circuits 30 mounted to a printed circuit board 32. The controller 30 may include analog and/or digital circuitry, and typically includes a digital signal processor (DSP), a microprocessor-based controller and a random access memory (RAM) device.

Figure 2:
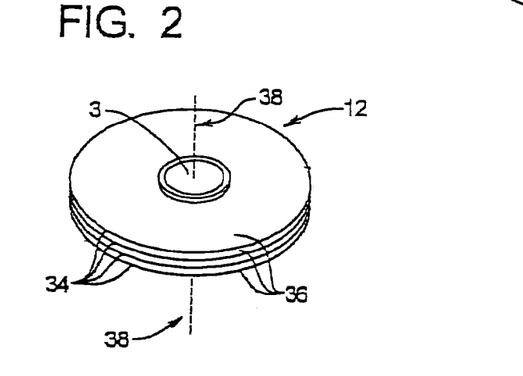
FIG. 2 is a block diagram of a disk stack having a plurality of data storage disks.

Referring now to the illustration of FIG. 2, the disk stack 12 typically includes a plurality of disks 34, each of which may have a pair of disk surfaces 36. The disks 34 are mounted on a cylindrical shaft and are configured to rotate about axis 38. The spindle motor 14 as mentioned above, rotates the disk stack 12. Although the disks 34 are described as magnetic disks for purposes of illustration, they may alternatively be optical disks or any other type of rewritable data storage disk.

Figure 3:
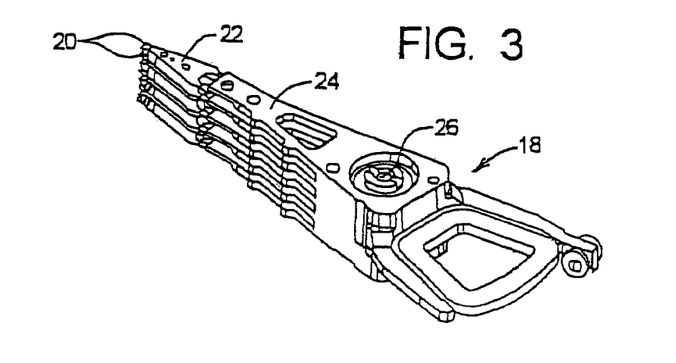
FIG. 3 is a perspective view of a portion of an actuator arm assembly having a plurality of actuator arms.

Referring now to the illustration of FIGS. 1 and 3, the actuator arm assembly 18 includes a plurality of the transducers 20, each of which are adjacent to a different one of the disk surfaces 36. Each transducer 20 is mounted to a corresponding flexure arm 22 which is attached to a corresponding portion of the actuator arm 24 that can rotate about the pivot bearing assembly 26. The VCM 28 operates to move the actuator arm 24, and thus moves the transducers 20 relative to their respective disk surfaces 36.

As will be explained in more detail below, the controller 30 is configured to read and write data from the disk 34 responsive to read and write instructions from a host device. Also in accordance with some embodiments of the present invention, the controller 30 is further configured to measure timing between particular information on the disks 34, and to control positioning of each transducer 20 relative to a selected track on the disks 34 while compensating for RRO of the disks 34 responsive to variation in the measured timing.

Figure 4:
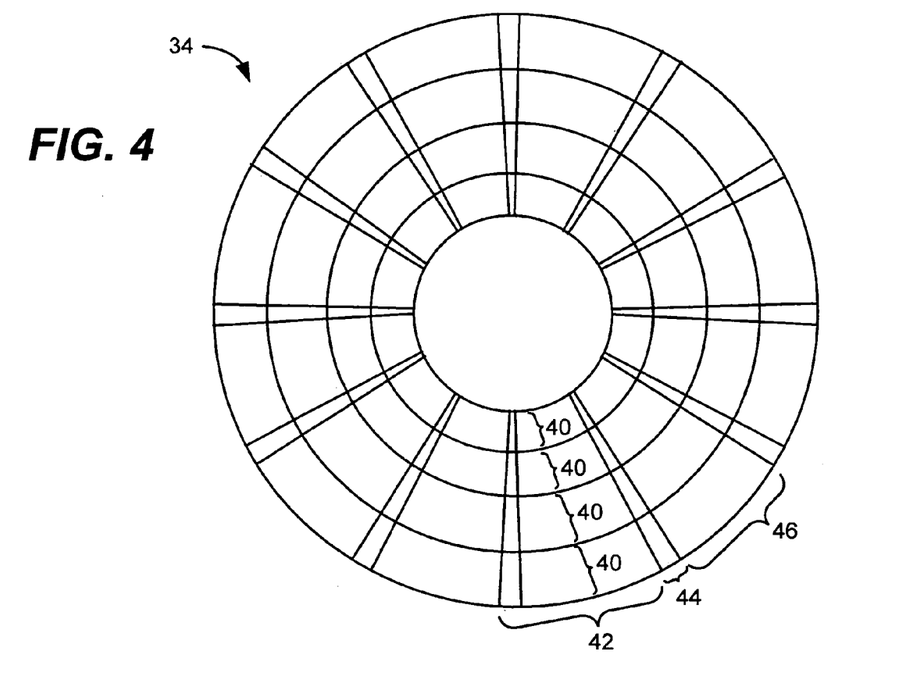
FIG. 4 is a top view of a disk and illustrates tracks and sectors, with each of the sectors being divided into a servo sector and a data sector.

FIG. 4 further illustrates one of the disks 34. Data is stored on the disk 34 within a number of concentric tracks 40 (or cylinders). Each track is divided into a plurality of radially extending sectors 42 on the disk 34. Each sector 42 is further divided into a servo sector 44 and a data sector 46. The servo sectors 44 of the disk 34 contain information that can define the radial location of the tracks 40, and is used to, among other things, accurately position the transducer 20 so that data can be properly written onto and read from the tracks 40. The servo information in each servo sector can include a servo address mark (SAM), servo positioning bursts, a synchronization pattern, along with other information. The data sectors 46 are where non-servo related data (i.e., data from a host device/user) is stored and retrieved. Such data, upon proper conditions, may be overwritten.

Ideally, the rotational center of data tracks defined by the servo information on the disk 34 would be aligned with a rotational axis of the spindle motor 14 so that the radial location of the tracks would not appear to have movement relative to a stationary transducer 20. However, as explained above, various conditions can cause runout of the disk 34 such that the rotational center of tracks defined by the servo information is offset from the rotational axis of the spindle motor 14.

Figure 5:
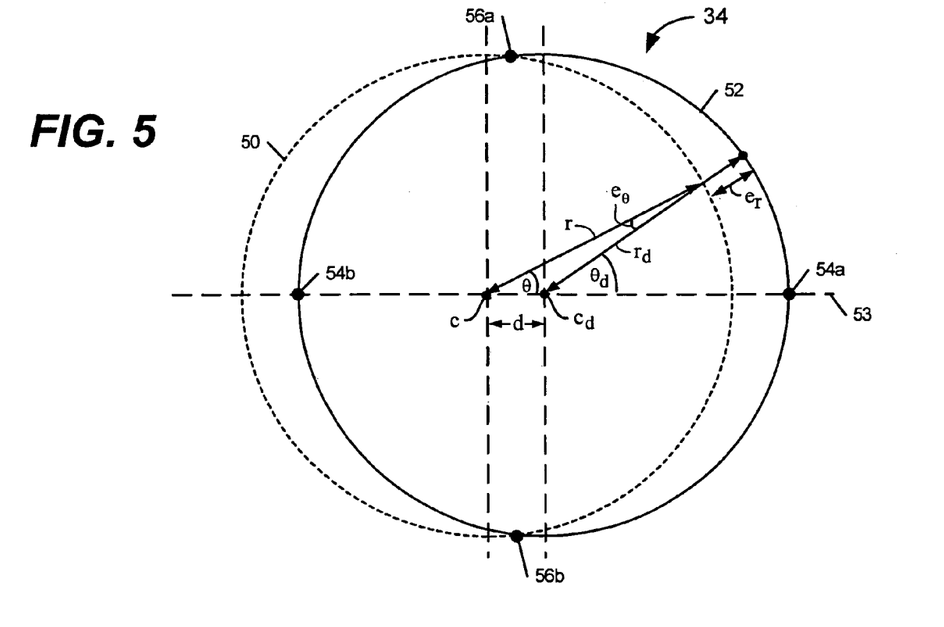
FIG. 5 is a top view of the disk and illustrates a track that is aligned with a rotational axis associated with the spindle motor and another track that is offset therefrom, and further illustrates relationships between the two tracks that can be used to compensate for RRO of the disk in accordance with some embodiments of the present invention.

FIG. 5 illustrates an aligned track 50 and an offset track 52 on the disk 34. The aligned track 50 has a rotational center that is aligned with the rotational axis "c" associated with the spindle motor 14, so that the track 50 may not exhibit RRO with respect to the transducer 20. The offset track 52 has a center "$c_d$" that is offset a distance "d" from the rotational axis "c" associated with the spindle motor 14. Consequently, the offset track 52 would exhibit RRO as the disk 34 rotates with respect to a stationary transducer 20. The disk center "$c_d$" of the offset track 52 can correspond to the center of servo tracks that are defined by servo positioning information (e.g., A,B,C,D servo positioning bursts) in the servo sectors 44.

The offset distance "d" and associated repeatable runout error "$e_r$" that have been illustrated in FIG. 5 have been exaggerated for purposes of illustration. For some disk drives, the servo information is written onto the servo sectors 44 while the disk 34 is external to the disk drive (referred to as "pack servo writing" and "external servo writing"), and then the disk 34 is installed in the disk drive 10 and connected to the spindle motor 14. Pack writing can be more commonly used during the manufacture of disk drives having smaller disks, such as disks with diameters of an inch or less. When the servo information is written by external servo writing, disk slip after the disk 34 is installed in the disk drive 10 can cause larger offset distance "d" and associated repeatable runout error "$e_r$" compared to when the servo information is written after the disk 34 is installed in the disk drive 10 and connected to the spindle motor 14. For example, the repeatable runout error "$e_r$" for some external servo written disks can have the radial width of several hundred tracks on a disk 34 having tens of thousands of tracks.

When the transducer 20 follows the offset track 52 as the disk 34 rotates about center "c", the repeatable runout error "$e_r$" is then the difference between a nominal radial distance "r" of the transducer 20 over a complete rotation of the disk 34 and a radial distance "$r_d$" of the transducer 20 relative to center "$c_d$" at a particular rotational angle of the disk 34. A rotational angle θ has been defined between a horizontal axis 53 and the radial line "r" between the rotational axis "c" and a location of the transducer 20 over the aligned track 52. Another rotational angle $θ_d$ has been defined between the horizontal axis 53 and the radial line "$r_d$" between the disk center "$c_d$" and a corresponding location of the transducer 20 on offset track 52. An error angle $e_θ$ has been defined between the radial lines "r" and "$r_d$".

As shown in FIG. 5, the repeatable runout error "$e_r$" reaches a maximum value at exemplary disk locations 54a-b and becomes zero at exemplary disk locations 56a-b. Because the transducer 20 is configured to move radially relative to the rotational axis "c", it must be continually moved in a periodic manner along the radial direction in order to follow the offset track 52. The illustrated runout is repeatable because the radial movement of the offset track 52 relative to the transducer 20 occurs synchronous to the angular position of the spinning disk 34. If all of the tracks on the disk are concentric to the offset track 52, adaptive runout cancellation may be used during track following to feed-forward a control signal to a servo controller in the disk drive to continually move the transducer 20 so as to compensate for the time varying magnitude of the repeatable runout error "$e_r$". Such continual movement of the transducer 20 during track following can consume a substantial amount of power in the disk drive 10, which may be unacceptable when the disk drive 10 is within a battery powered device, and can add undesirable complexity and cost to the disk drive 10.

As explained above, the controller 30 is configured to measure timing between particular information on the disks 34, and to control positioning of each transducer 20 relative to a selected track on the disk 34 while compensating for RRO of the disk 34 responsive to variation in the measured timing. By measuring an elapsed time between particular information on the disk 34, such as the SAMs in each servo sector 44, the controller 30 can determine the repeatable runout error "$e_r$" and associated offset distance "d". The controller 30 can then position the transducer 20 relative to a selected track based on the position error signal, which is generated by reading the servo information, and based on the determined repeatable runout error "$e_r$". The controller 30 may thereby compensate for the effects of repeatable runout error "$e_r$" on the position error signal so as to move the transducer 20 relative to tracks that are more closely concentric with the aligned track 50 than the offset track 52. Relationships between variation in the measured timing and RRO characteristics will now be described below with continuing reference to FIG. 5. One of more of these relationships and associated equations may be used by the controller 30 to compensate for the RRO of the disk 34.

With continuing reference to FIG. 5, the repeatable runout error "$e_r$" can be determined from Equation 1 below:

$$e_r = r - r_d \qquad \text{(Equation 1)}$$

The radial distance "$r_d$" of the transducer 20 relative to center "$c_d$" at a particular angle θ of the disk 34 can be determined from Equation 2 below:

$$r_d = \sqrt{r^2 + d^2 - 2rd\cos\theta}. \quad \text{(Equation 2)}$$

When the offset distance "d" is much less than the radial distance "r", the radial distance "$r_d$" is about equal to r−dcosθ, and the repeatable runout error "$e_r$" can be determined from Equation 3 below:

$$e_r \approx d\cos\theta = d\cos(\omega t), \quad \text{(Equation 3)}$$

where ω is the rotational velocity of the disk 34. Because of the non-zero offset distance "d", when the radial position of the transducer 20 is determined from servo information on the disk 34 that is aligned with the offset track 52, the determined radial position can contain repeatable runout error "$e_r$" that varies in synch with the angular rotation of the disk 34.

As shown in FIG. 5, the offset distance "d" causes a periodic change in the angular displacement $\theta_d$ of the transducer 20 with respect to the disk center "$c_d$", and causes a variation in the timing between when particular information, such as a SAM, is read by the transducer 20 from adjacent servo sectors 44. More particular, the arcuate distance that the transducer 20 travels between SAMs in adjacent servo sectors 44 varies based on the magnitude of the repeatable runout error "$e_r$". The time between SAMs in adjacent servo sectors 44 increases as the repeatable runout error "$e_r$" increases, and decreases as the repeatable runout error "$e_r$" decreases.

When the following relationship shown in Equations 4 is true, $$d \ll r, \quad \text{(Equation 4a)}$$

the angle $e_\theta$ can be approximated from Equation 5 below $$e_\theta \approx \frac{d}{r}\sin\theta. \quad \text{(Equation 5)}$$

The angular displacement $\theta_d$ of the transducer 20 with respect to the disk center "$c_d$" can then be determined from Equation 6 below:

$$\theta_d = \theta + e_\theta \approx \theta + \frac{d}{r}\sin(\theta) = \omega t + \frac{d}{r}\sin(\omega t). \quad \text{(Equation 6)}$$

Further exemplary relationships are now defined based on there being "N" servo sectors 44 around the disk 34, and the transducer 20 reading a SAM in servo sector number "k" at time "t" and reading a SAM in an adjacent servo sector number "k+1" at time "t+Td". The term "Td" is the timing interval between the SAMs of servo sectors "k" and "k+1". The angular and radial location of the transducer 20, such as that shown in FIG. 5 can then be determined from Equation 7 below:

$$\theta_d(t + T_d) - \theta_d(t) = \quad \text{(Equation 7)}$$
$$\omega(t + T_d) + \frac{d\sin(\omega(t + T_d))}{r} - \left(\omega t + \frac{d\sin(\omega t)}{r}\right) =$$

-continued
$$\omega T_d + \frac{d}{r}[\sin(\omega(t + T_d)) - \sin(\omega t)] = \frac{2\pi}{N}$$

When $\omega T_d$ of Equation 7 is small, then the approximate relationship that is shown in Equation 8 can be formed:

$$\omega T_d + \frac{d}{r}[\sin(\omega(t + T_d)) - \sin(\omega t)] \approx \quad \text{(Equation 8)}$$
$$\omega T_d\left(1 + \frac{d}{r}\cos(\omega t)\right).$$

Substituting the approximation of Equation 8 into Equation 7 provides the following Equation 9 for the timing interval "Td" that can be measured between SAMs in servo sectors "k" and "k+1" (or between other particular information on the disk 34):

$$T_d \approx \frac{2\pi}{N\omega}\left(\frac{1}{1 + \frac{d}{r}\cos(\omega t)}\right). \quad \text{(Equation 9)}$$

The nominal timing interval "T" between SAMs of adjacent servo sectors 44 be determined from the following Equation 10:

$$T = \frac{2\pi}{N\omega}. \quad \text{(Equation 10)}$$

The variation in the measured timing $e_T$ between SAMs in adjacent servo sectors 44 can be determined from the difference between the nominal timing interval "T" and the measured timing interval "Td" between SAMs in particular adjacent servo sectors 44, and which can be determined from Equation 11 below:

$$e_T = T - T_d = \frac{2\pi}{N\omega}\left(\frac{\frac{d}{r}\cos(\omega t)}{1 + \frac{d}{r}\cos(\omega t)}\right). \quad \text{(Equation 11)}$$

When d≪r, the variation in the measured timing $e_T$ can be determined from the following Equation 12:

$$e_T \approx \frac{2\pi}{N\omega}\frac{d}{r}\cos(\omega t). \quad \text{(Equation 12)}$$

Equation 12 can be rewritten so that the offset distance "d" can be determined therefrom, as shown by Equation 13 below:

$$d \approx \frac{e_T N\omega r}{2\pi\cos(\omega t)}. \quad \text{(Equation 13)}$$

Combining Equations 3 and 12 provides the following Equation 14 for the determination of the repeatable runout error "$e_r$":

$$e_r \approx \frac{N\omega}{2\pi} r e_T. \quad \text{(Equation 14)}$$

From Equation 14 the variation in the measured timing $e_T$ between particular information on the disk 34, such as between SAMs in each of the servo sectors 44, can be used to determine the repeatable runout error "$e_r$".

Figure 6:
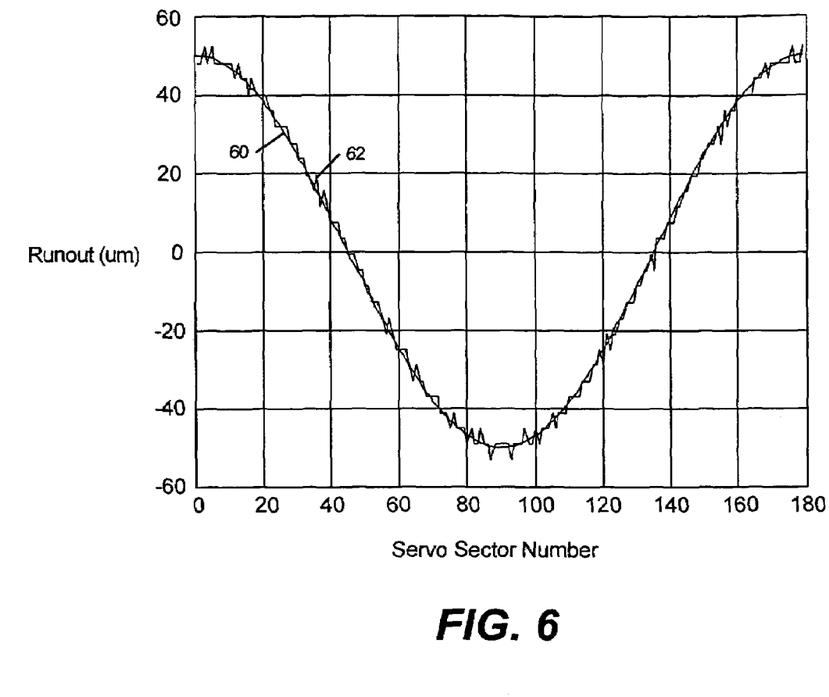
FIG. 6 is a graph of a simulation of actual RRO and estimated RRO for a disk.

FIG. 6 is a graph that illustrates a simulation of actual RRO for a disk, shown by the smooth line 60, and an estimate of RRO, illustrated by the jittering line 62, that is calculated from Equation 14 using an estimate of the variation in measured timing $e_T$ between SAMs in servo sectors around the disk. The simulation was performed with an offset distance "d" of 50 μm, the transducer 20 at a radial position "r" of 25 mm, the number "N" of servo sectors at 180 per revolution of the disk 34, a disk rotational velocity of 7200 RPM, and a SAM to SAM timing measurement resolution of 10 ns. As show in FIG. 6, the estimated runout 62 closely matches the actual runout 60. The jittering that is exhibited by the estimated runout 62 can be reduced, and may be eliminated, by filtering (e.g., averaging) the variation in the measured timing $e_T$.

The controller 30 of the disk drive 10 that is configured to compensate for RRO of the disk 34 in accordance with some embodiments of the present invention will now be explained with regard to FIGS. 7-10.

Figure 7:
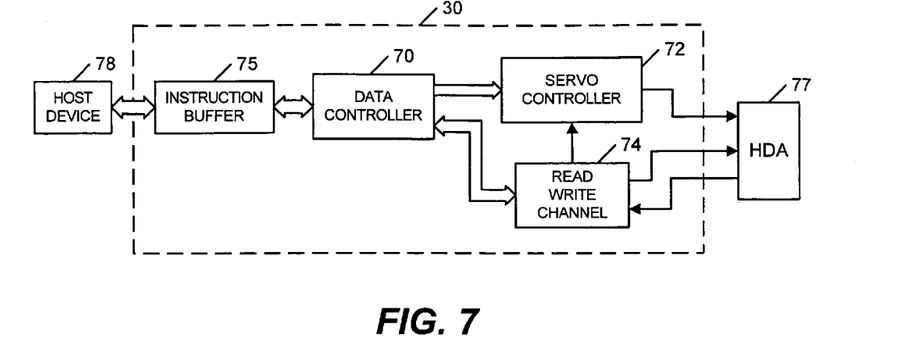
FIG. 7 is a block diagram of a portion of the controller of the disk drive shown in FIG. 1 according to some embodiments of the present invention.

Referring to FIG. 7, the controller 30 can include a data controller 70, a servo controller 72, a read/write channel 74, and an instruction buffer 75. The exemplary embodiment of the controller 30 has been illustrated with components that include two separate controllers 70,72, instruction buffer 75, and read/write channel 74 for purposes of illustration and discussion only. It is to be understood that the functionality that is described herein for one or more of those components may be consolidated in fewer components or distributed among more components.

The controller 30 is configured to respond to read and write instructions from a host device 78 by reading and writing data on a head disk assembly (HDA) 77. The HDA 77 can include the actuator arm assembly 18, the disk stack 12, and the spindle motor 14. More particularly, read instructions and write instructions with associated data and block addresses from the host device 78 can be buffered in the instruction buffer 75. The data controller 70 can be configured to carry out a buffered write instruction by formatting the associated data into blocks with the appropriate header information, and to transfer the formatted data from the instruction buffer 75, via the read/write channel 74, to block addresses on the disk 34 that are identified by the write command. The data controller 70 can also be configured to carry out a buffered read instruction by reading, via the read write channel 74, data from block addresses on the disk 34 that are identified by the read instruction and to transfer the data to the host device 78.

The read/write channel 74 can operate in a conventional manner to convert data between the digital form used by the data controller 70 and the analog form conducted through the transducers 20 in the HDA 77. The read/write channel 74 provides servo information read by the transducer 20 from a servo sector 44 on the disk 34 in HDA 77 to the servo controller 72. The servo information can be used to detect the location of the transducer 20 in relation to block addresses on the disk 34. The servo controller 72 can use the block addresses from the data controller 70 and the servo positional information to seek the transducer 20 to an addressed track and block on the disk 34, and to maintain the transducer 20 aligned with the track while data is written/read on the disk 34. Accordingly, the data controller 70 and the servo controller 72 are collectively configured to carry out a write/read instruction by positioning the transducer 20 relative to a selected track on the disk 34 while writing/reading data on the track.

Figure 8:
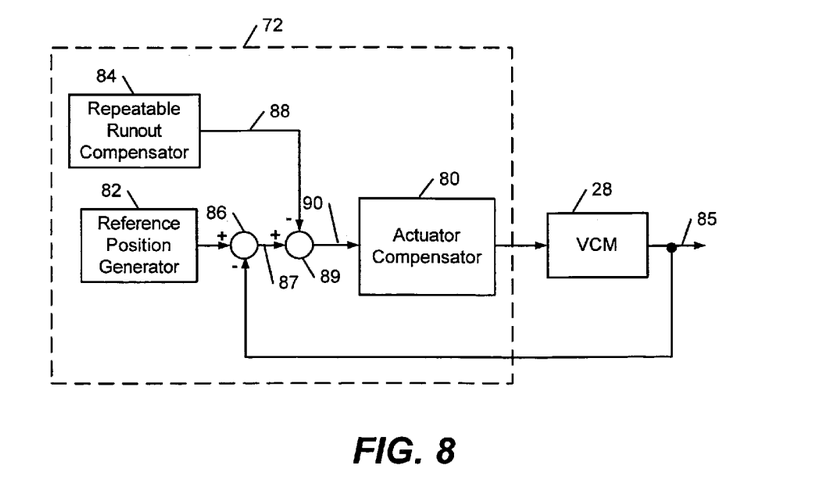
FIG. 8 is a block diagram of the servo controller shown in FIG. 7 in accordance with some embodiments of the present invention.

FIG. 8 is a block diagram of an exemplary embodiment of the servo controller 72, which is configured to control positioning of the transducer 20 via the VCM 28 in accordance with some embodiments of the present invention. The exemplary servo controller 72 includes an actuator compensator 80, a reference position generator 82, and a RRO compensator 84. During a track following operation, the servo controller 72 receives a position signal 85 from the transducer 20, as the transducer reads servo positioning bursts within the information in the servo sectors 44. The position signal 85 is fed-back to a summing node 86, where it is combined with a desired reference position signal from the reference position generator 82 to generate a position error signal 87.

The desired reference position signal generated by the reference position generator 82 may be a DC value (e.g., static value), such as zero, for at least a portion of the revolution of the disks 34. The desired reference position signal may be defined to cause the transducer 20 to be aligned with a centerline of a track or to be offset therefrom by a predetermined radial distance.

The RRO compensator 84 is configured to generate a RRO compensation signal 88. The RRO compensation signal 88 is subtracted from the position error signal 87 at a combining node 89 to generate an compensator input signal. The actuator compensator 80 is configured to maintain the transducer 20 on a track during track following by controlling positioning of the transducer 20, via the VCM 28, in response to the actuator control signal 90.

The RRO compensator 84 is configured to measure timing between SAMs within the servo information in the servo sectors 44 and/or based on other particular information on the disk 34. It is further configured to determine the repeatable runout "$e_r$" and/or the offset distance "d" for the transducer positioning information from the position error signal 87. The RRO compensator 84 may determine the offset distance "d" through Equation 13 and/or by the other relationships and equations described above that associate timing variation between information read from the disk 34 and RRO.

The RRO compensator 84 generates the RRO compensation signal 88 so as to compensate for the effects of RRO on the position error signal. The RRO compensator 84 may measure the magnitude and phase of at least a first harmonic of the RRO of the disk 34, and generate the RRO compensation signal 88 so at least the measured first harmonic of the RRO is compensator for when the actuator compensator 80 positions by the transducer 20 relative to the disk 34. Because the actuator compensator 80 positions the transducer 20 in response to the difference between the RRO compensation signal 88 and the position error signal 87, the actuator compensator 80 can be induced to follow tracks that are more closely concentric to the rotational axis "c" associated with the spindle motor 14 (e.g., aligned track 50 of FIG. 5) than the center "$c_d$" defined by the servo position information on the disk 34 (e.g., offset track 52 of FIG. 5).

The transducer 20 may thereby follow tracks that are substantially concentric to the rotational axis "c" associated with the spindle motor 14 such that a selected track may appear to have no radial movement attributable to RRO relative to the stationary transducer 20.

Figure 9:
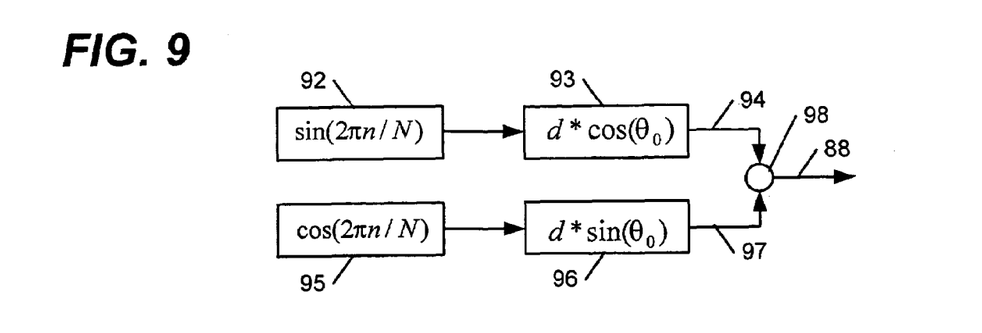
FIG. 9 is a block diagram of the repeatable runout compensator shown in FIG. 8 in accordance with some embodiments of the present invention.

FIG. 9 is a block diagram of the RRO compensator 84 and illustrates how the RRO compensation signal 88 can be generated in accordance with some embodiments of the present invention. In Block 92, a first value (value1) is determined from the following Equation 15:

$$\text{value1} = \sin(2\pi n/N). \qquad \text{(Equation 14)}$$

In Equation 14, "n" is a number of the servo sector 44 read by the transducer 20. The servo sectors 44 are sequentially numbered around the disk 34. The number "n" of a particular one of the servo sectors 44 that is presently being read by the transducer 20 may be determined from the servo address that can be encoded within the servo information in each of the servo sectors 44. As explained above, the term "N" is the number of servo sectors 44 around the disk 34.

For each of the servo sectors numbers 1 through N, the associated first value (value1) may be predefined within a look-up table in the RRO compensator 84, and from where it can be retrieved responsive to a present servo sector number "n". The look-up table may, for example, reside within a memory in the RRO compensator 84 and/or it may be recorded on a utility area of the disk 34. When the look-up table is recorded on the utility area of the disk 34, it may be written without RRO compensation such that the data tracks in the utility area are not concentric with data tracks outside of the utility area, and, in which case, a buffer region may be defined therebetween to avoid overlap.

In Block 93, a second value (value2) is determined from the following Equation 15:

$$\text{value2} = d^* \cos(\theta_0). \qquad \text{(Equation 15)}$$

In Equation 14, "d" is the offset distance. The term $\theta_0$ is a present rotational angle of the disk from the servo sector 44 where the timing between SAMs in two adjacent servo sectors is substantially equal to the nominal timing between SAMs. The first and second values (value1, value2) are multiplied to generate a value 94 that is provided to a combining node 98.

In Block 95, a third value (value3) is determined from the following Equation 16:

$$\text{value3} = \cos(2\pi n/N). \qquad \text{(Equation 16)}$$

In Block 96, a fourth value (value4) is determined from the following Equation 17:

$$\text{value4} = d^* \sin(\theta_0). \qquad \text{(Equation 17)}$$

The third and fourth values (value3, value4) are multiplied to generate a value 97 that is provided to the combining node 98. The combining node 98 combines (e.g., adds) values 94 and 97 to generate the RRO compensation signal 88.

Once the offset distance "d" has been determined from the timing information from each of the servo sectors 44, the intermediate and/or final values that are then used for generating the RRO compensation signal 88 may be stored, for example, within a memory in the RRO compensator 84 and/or they may be recorded on a utility area of the disk 34. The values may then be selectively retrieved therefrom responsive to a servo sector number that is associated with servo information read from the disk 34. The calculation of RRO for one or more of the disks 34 may be performed at any time during operation of the disk drive 10, such as during self-test upon power-up of the disk drive 10, after awakening from a sleep mode, and/or when the disk drive is idle and awaiting a read/write instruction from the host device 78.

Figure 10:
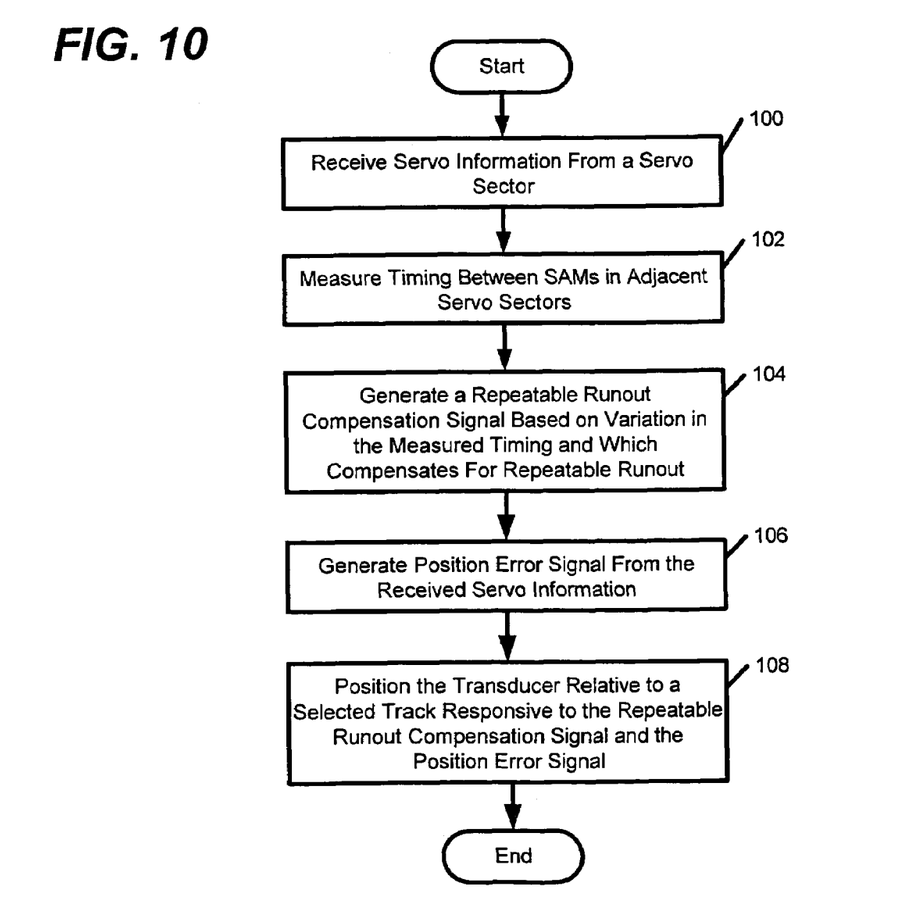
FIG. 10 is a flowchart showing operations for compensating for RRO based on variation in timing between information (e.g., SAMs in servo sectors) on the disk.

Reference is now made to FIG. 10 which is flowchart of operations that may be carried out by the controller 30 and, more particularly, by the servo controller 72 in accordance with various embodiments of the present invention. Servo information is received at Block 100 from one of the servo sectors 44 on the disk 34. The timing between SAMs in adjacent servo sectors 44 is measured at Block 102 from the received servo information and previously received servo information. A RRO compensation signal is generated at Block 104 based on variation in the measured timing, the RRO compensation signal compensating for RRO of the disk 34. A position error signal is generated at Block 106 from the received servo information (e.g., from servo positioning bursts in the servo sectors 44). The transducer 20 is positioned at Block 108 relative to a track responsive to the RRO compensation signal and the position error signal.

Although RRO compensation has been discussed primarily in the context of compensating for RRO of single disk 34 with respect to a single transducer 20 for easy of illustration and explanation, it is to be understood that embodiments of the present invention are not limited thereto. Instead, the operations and actions described above may be performed for each of the disks 34 and/or disk surface 36 in the disk stack 12.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A disk drive comprising:
   a rotatable data storage disk comprising information and data tracks defined thereon;
   a transducer that is configured to read the information from the disk;
   an actuator that is configured to position the transducer relative to the data tracks; and
   a controller that is configured to measure timing between particular information on the disk, to determine radial offset distance based on the measured timing, to estimate repeatable runout of the disk based on the radial offset distance, and to radially position the transducer relative to a selected track in response to the estimated repeatable runout and a position error signal from servo information read by the transducer.

2. The disk drive of claim 1, wherein:
   the disk comprises the servo information in servo sectors of the disk; and
   the controller is further configured to measure timing between the servo information in different servo sectors of the disk, and to estimate repeatable runout of the disk based on variation in the measured timing.

3. The disk drive of claim 2, wherein:
   the servo information defines concentric servo tracks around the disk; and
   the controller is further configured to determine a radial offset distance between a radial location defined by the servo tracks and a radial location at which the data tracks would have reduced repeatable runout relative to the transducer, and configured to radially position the transducer relative to a selected track responsive to the determined radial offset distance.

4. The disk drive of claim 3, wherein the controller comprises:
a repeatable runout compensator that is configured to determine a rotational angle of the disk from servo information read from one of the servo sectors, to determine the radial offset distance based on the measured timing and the determined rotational angle of the disk, and to generate a runout compensation signal based on the radial offset distance which compensates for repeatable runout of the disk; and
an actuator compensator that is configured to radially position the transducer relative to a selected track responsive to the runout compensation signal and the position error signal from servo information read by the transducer.

5. The disk drive of claim 2, wherein the controller is further configured to measure timing between the servo information in adjacent first and second ones of the servo sectors of the disk, and to control radial positioning of the transducer relative to at least some tracks between the first and second servo sectors while compensating for repeatable runout of the disk responsive to the measured timing between the servo information in the adjacent first and second servo sectors.

6. The disk drive of claim 5, wherein the controller is further configured to measure an average timing between all adjacent servo sectors around the disk, and to radially position the transducer relative to at least some tracks between the first and second servo sectors responsive to the measured timing between the servo information in the adjacent first and second servo sectors and the average timing.

7. The disk drive of claim 2, wherein:
the servo information in each sector comprises a servo address mark (SAM); and
the controller is further configured to measure timing between the SAM in different servo sectors of the disk, and to estimate repeatable runout of the disk based on the measured timing.

8. The disk drive of claim 7, wherein the controller is further configured to measure timing between the SAM in adjacent first and second ones of the servo sectors of the disk, and to control radial positioning of the transducer relative to at least some tracks between the first and second servo sectors to compensate for repeatable runout of the disk responsive to the measured timing between the SAM in the adjacent first and second servo sectors.

9. The disk drive of claim 1, wherein the controller is further configured to measure a magnitude and phase of at least a first harmonic of repeatable runout of the disk based on variation in the measured timing and to generate a repeatable runout compensation signal therefrom, and to radially position the transducer responsive to the position error signal and the repeatable runout compensation signal.

10. The disk drive of claim 9, wherein the controller is further configured to subtract the repeatable runout compensation signal from the position error signal to generate an actuator control signal, and to control radial positioning of the actuator relative to a selected data track responsive to the actuator control signal.

11. The disk drive of claim 1, wherein the controller is configured to filter the measured timing to generate filtered timing values, and compensate for repeatable runout of the disk responsive to the filtered timing values.

12. A method of compensating for repeatable runout of a data storage disk in a disk drive, the method comprising:
reading information from the disk;
measuring timing between the read information;
determining radial offset distance based on the measured timing;
estimating repeatable runout of the disk based on the radial offset distance; and
radially positioning the transducer relative to a selected track on the disk in response to the estimated repeatable runout and a position error signal from servo information read by the transducer.

13. The method of claim 12, wherein:
the disk comprises the servo information in servo sectors of the disk; and
measuring timing between the read information comprises measuring timing between the servo information in different servo sectors of the disk.

14. The method of claim 13, wherein
the servo information defines concentric servo tracks around the disk; and
estimating repeatable runout of the disk comprises determining a radial offset distance between a radial location defined by the servo tracks and a radial location at which the data tracks would have reduced repeatable runout relative to the transducer, and estimating the repeatable runout based on the offset distance.

15. The method of claim 13, wherein:
measuring timing between the servo information in different servo sectors of the disk comprises measuring timing between the servo information in adjacent first and second ones of the servo sectors of the disk; and
the transducer is radially positioned relative to at least some tracks between the first and second servo sectors in response to the measured timing between the servo information in the adjacent first and second servo sectors.

16. The method of claim 15, further comprising measuring an average timing between all adjacent servo sectors around the disk, wherein the transducer is radially positioned relative to at least some tracks between the first and second servo sectors responsive to the measured timing between the servo information in the adjacent first and second servo sectors and the average timing.

17. The method of claim 13, wherein:
the servo information in each sector comprises a servo address mark (SAM); and
measuring timing between the servo information in different servo sectors of the disk comprises measuring timing between the SAM in different servo sectors of the disk.

18. The method of claim 17, wherein:
measuring timing between the SAM in different servo sectors of the disk comprises measuring timing between the SAM in adjacent first and second ones of the servo sectors of the disk; and
estimating repeatable runout of the disk comprises estimating the repeatable runout of the disk based on the measured timing between the SAM in the adjacent first and second servo sectors.

19. The method of claim 12, wherein:
estimating repeatable runout of the disk comprises generating a repeatable runout compensation signal from the variation in the measured timing that is indicative of a magnitude and phase of at least a first harmonic of repeatable runout of the disk; and the transducer is radially positioned relative to the selected track in response to the repeatable runout compensation signal and the position error signal.

20. The method of claim 19, wherein generating a repeatable runout compensation signal comprises generating an actuator control signal from a difference between the repeatable runout compensation signal and the position error signal; and the transducer is radially positioned relative to the selected track by the actuator in response to the actuator control signal.

* * * * *